United States Patent
Bertilsson et al.

(10) Patent No.: US 9,739,546 B2
(45) Date of Patent: Aug. 22, 2017

(54) HEAT EXCHANGER PLATE AND A PLATE HEAT EXCHANGER WITH INSULATED SENSOR INTERNAL TO HEAT EXCHANGE AREA

(75) Inventors: Klas Bertilsson, Eslöv (SE); Anders Nyander, Kristianstad (SE); Christer Johansson, Göteborg (SE); Anatol Krozer, Göteborg (SE)

(73) Assignee: ALFA LAVAL CORPORATE AB, Lund (SE)

( * ) Notice: Subject to any disclaimer, the term of this patent is extended or adjusted under 35 U.S.C. 154(b) by 721 days.

(21) Appl. No.: 13/880,855

(22) PCT Filed: Oct. 3, 2011

(86) PCT No.: PCT/SE2011/051177
§ 371 (c)(1),
(2), (4) Date: Apr. 22, 2013

(87) PCT Pub. No.: WO2012/053958
PCT Pub. Date: Apr. 26, 2012

(65) Prior Publication Data
US 2013/0206359 A1     Aug. 15, 2013

(30) Foreign Application Priority Data

Oct. 22, 2010  (SE) ..................... 1051102

(51) Int. Cl.
*B60H 1/00* (2006.01)
*F28F 27/00* (2006.01)
(Continued)

(52) U.S. Cl.
CPC .............. *F28F 27/00* (2013.01); *F28F 3/005* (2013.01); *F28F 3/083* (2013.01); *F28F 3/10* (2013.01);
(Continued)

(58) Field of Classification Search
CPC .......... F28F 3/00; F28F 9/0246; F28F 9/0253; F28F 1/003; F28F 2265/00;
(Continued)

(56) References Cited

U.S. PATENT DOCUMENTS 3,824,460 A * 7/1974 Gustafson ............. G01F 23/265
                                                    324/664
4,527,908 A * 7/1985 Arisi ...................... G01K 17/06
                                                    122/448.1
(Continued)

FOREIGN PATENT DOCUMENTS

CN     1711454 A    12/2005
CN     1965221 A    5/2007
(Continued)

OTHER PUBLICATIONS

JP2009222400 translation description.*
(Continued)

*Primary Examiner* — Len Tran
*Assistant Examiner* — Gordon Jones
(74) *Attorney, Agent, or Firm* — Buchanan Ingersoll & Rooney PC

(57) ABSTRACT

A plate heat exchanger includes a heat exchanger plate having a heat transfer area and an edge area, extending around the heat transfer area. The heat exchanger plate is a double wall plate formed by two adjoining plates compressed to be in contact with each other. A sensor configured to sense at least one parameter and to produce a signal depending on the parameter includes a sensor probe that is provided between the adjoining plates.

15 Claims, 4 Drawing Sheets

(51) Int. Cl.
  *F28F 3/10* (2006.01)
  *G01M 3/40* (2006.01)
  *G01M 3/18* (2006.01)
  *F28F 3/00* (2006.01)
  *F28F 3/08* (2006.01)

(52) U.S. Cl.
  CPC .............. *G01M 3/188* (2013.01); *G01M 3/40* (2013.01); *F28F 2265/16* (2013.01)

(58) Field of Classification Search
  CPC .......... F28F 2265/16; F28F 3/08; F28F 3/083; F28F 3/086; F28F 3/10; F28F 27/00; F28F 3/005; F28D 9/00; F28D 1/035; F28D 9/0037; F28D 9/0043; F24F 11/02; G01M 3/40; G01M 3/188
  USPC ....... 165/165, 166, 167, 11.1, 70; 73/40.5 R, 73/40, 40.5 A
  See application file for complete search history.

(56) References Cited

U.S. PATENT DOCUMENTS

| | | | |
|---|---|---|---|
| 4,602,674 A | | 7/1986 | Eriksson |
| 4,765,178 A | | 8/1988 | Kempf et al. |
| 4,894,827 A | * | 1/1990 | Ramsay ................. G06F 11/08 714/4.1 |
| 4,903,758 A | * | 2/1990 | Cowan ................... F28F 3/083 165/111 |
| 5,159,276 A | * | 10/1992 | Reddy, III ............ G01M 3/165 174/11 R |
| 5,174,150 A | | 12/1992 | Mann |
| 5,178,207 A | * | 1/1993 | Bergqvist ................. F28F 3/10 165/167 |
| 5,546,009 A | * | 8/1996 | Raphael ............... G01F 23/242 324/556 |
| 5,661,405 A | * | 8/1997 | Simon .................... G01N 27/07 174/11 R |
| 6,817,408 B2 | * | 11/2004 | Lines .................... F25B 25/005 165/231 |
| 6,959,492 B1 | | 11/2005 | Matsumoto et al. |
| 7,152,663 B2 | * | 12/2006 | Helin ..................... F28D 9/005 165/11.1 |
| 7,185,893 B2 | * | 3/2007 | Wampula ............... F02F 11/002 277/317 |
| 7,337,836 B1 | | 3/2008 | Persson |
| 7,857,036 B2 | | 12/2010 | Bergqvisy et al. |
| 8,104,531 B2 | | 1/2012 | Tochon et al. |
| 8,646,517 B2 | | 2/2014 | Blomgren |
| 8,776,866 B2 | * | 7/2014 | Cederberg .............. F28F 3/083 165/11.1 |
| 2006/0124274 A1 | | 6/2006 | Cieslik et al. |
| 2007/0051166 A1 | | 3/2007 | Baker et al. |
| 2009/0194267 A1 | * | 8/2009 | Gustafsson ............ F28D 9/005 165/168 |
| 2010/0263823 A1 | | 10/2010 | Mitsuhashi et al. |

FOREIGN PATENT DOCUMENTS

| | | | | |
|---|---|---|---|---|
| CN | 101563155 A | | 10/2009 | |
| CN | 201607162 U | | 10/2010 | |
| DE | 39 03 084 A1 | | 8/1990 | |
| DE | 39 10 850 A1 | | 10/1990 | |
| DE | 41 00 651 A1 | | 7/1992 | |
| DE | 42 07 761 A1 | | 9/1992 | |
| EP | 0633460 A | | 5/1994 | |
| GB | 2062833 A | * | 5/1981 | .............. F28F 3/083 |
| GB | 2 208 005 A | | 2/1989 | |
| JP | 04331339 A | | 11/1992 | |
| JP | 05-039921 A | | 2/1993 | |
| JP | 9-243279 A | | 9/1997 | |
| JP | 2000-161889 A | | 6/2000 | |
| JP | 2002-107089 A | | 4/2002 | |
| JP | 2002-156194 A | | 5/2002 | |
| JP | 2003-336990 A | | 11/2003 | |
| JP | 2006-313030 A | | 11/2006 | |
| JP | 2009-528504 A | | 8/2009 | |
| JP | 2009222400 A | * | 10/2009 | .............. G01D 18/00 |
| JP | 2009-540257 A | | 11/2009 | |
| JP | 3161676 U | | 7/2010 | |
| RU | 2364812 C1 | | 8/2009 | |
| WO | WO 88/03253 A1 | | 5/1988 | |
| WO | WO 01/16544 A1 | | 3/2001 | |
| WO | 03/023351 A1 | | 3/2003 | |
| WO | WO 2005/119197 A1 | | 12/2005 | |
| WO | 2006/084263 A2 | | 8/2006 | |
| WO | 2007/142592 A1 | | 12/2007 | |

OTHER PUBLICATIONS

International Search Report (PCT/ISA/210) issued on Feb. 6, 2012, by the Swedish Patent Office as the International Searching Authority for International Application No. PCT/SE2011/051177.
Chinese Office Action issued Jun. 16, 2014, by the Chinese Patent Office, in corresponding Chinese Patent Application No. 201180050965, and English language translation of Chinese Office Action (12 pages).
English translation of Russian Office Action (Decision on Grant) dated Jun. 25, 2014, issued in corresponding Russian Application No. 2013123131(4 pgs).
Grounds of the Examination Report dated May 15, 2014, issued in corresponding Taiwan Patent Application No. 100137670 and English translation of the Grounds of the Examination Report (13 pgs).
Notification Concerning Transmittal of International Preliminary Report on Patentability (Forms PCT/IB/326 and PCT/IB/373) and the Written Opinion of the International Searching Authority (Form PCT/ISA/237) dated May 2, 2013, issued in corresponding International Application No. PCT/SE2011/051177. (7 pgs).
English language translation of Japanese Office Action (First Office Action) dated Mar. 4, 2014, issued by the Japanese Patent Office in corresponding Japanese Patent Application No. 2013-534855 (6 pages).
English language translation of South Korean Office Action (KIPO's Notice of Preliminary Rejection) dated Oct. 8, 2013, issued by the South Korean Patent Office in corresponding South Korean Patent Application No. 10-2013-7010025. (2 pages).

* cited by examiner

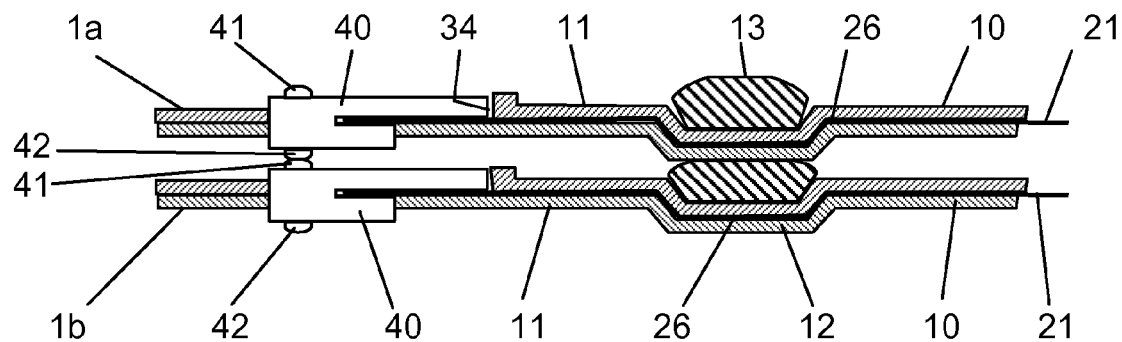
Fig 5
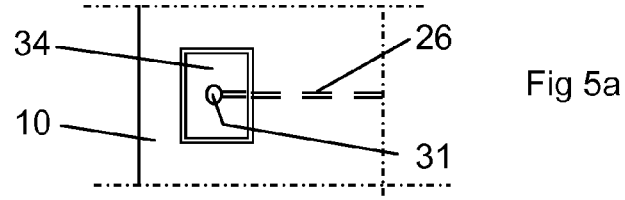
Fig 5a
Fig 6
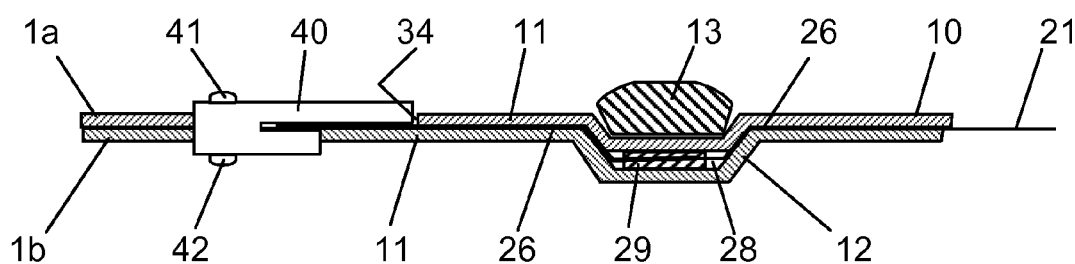
Fig 7
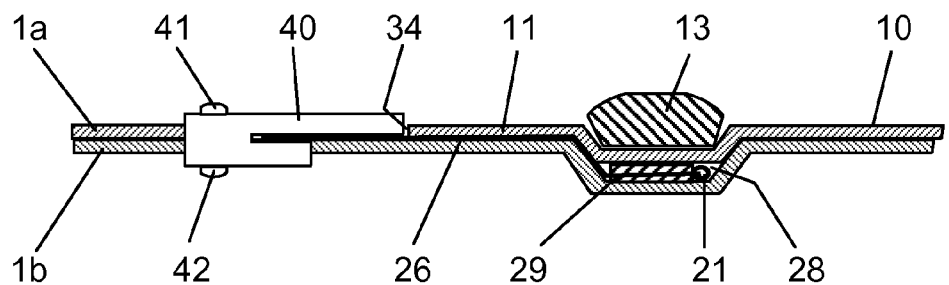

HEAT EXCHANGER PLATE AND A PLATE HEAT EXCHANGER WITH INSULATED SENSOR INTERNAL TO HEAT EXCHANGE AREA

TECHNICAL FIELD OF THE INVENTION

The present invention refers to a heat exchanger plate for a plate heat exchanger, comprising a heat transfer area, and an edge area, which extends around and outside the heat transfer area, wherein the heat exchanger plate is a double wall plate formed by two adjoining plates compressed to be in contact with each other. The invention also refers to a plate heat exchanger comprising a plurality of such heat exchanger plates arranged beside each other to define several first plate interspaces for a first medium and several second plate interspaces for a second medium.

BACKGROUND OF THE INVENTION AND PRIOR ART

In plate heat exchangers, where a leak barrier is desired to prevent the media form mixing, it is known to use double wall plates, i.e. plates each comprising two adjoining plates compressed to be in contact with each other. The standard double wall plate gives an additional safety barrier, but normally it is difficult to detect when one of the adjoining plates is leaking. If leakage occurs due to a mechanical crack in one of the adjoining plates, one of the first and second media will enter into the space, which is very thin, between the adjoining plates. This medium may be allowed to flow out of the space between the adjoining plates downwardly to the floor beneath the plate heat exchanger. This may serve as an indication of leakage. However, it is with this known method not possible to determine which heat exchanger plate is cracked. Furthermore, the time period from the beginning of the leakage to the detection of the media on the floor can in certain circumstances be too long.

U.S. Pat. No. 5,178,207 discloses a plate heat exchanger of the kind initially defined. The heat exchanger plates are double wall plates formed by two adjoining plates compressed to be in contact with each other. A spacing member is provided in each double wall plate between the adjoining plates. The spacing member facilitates any leaking fluid to flow out of the plate heat exchanger to the surroundings, thereby facilitating detection of the leaking fluid.

WO 88/03253 and WO 01/16544 disclose other examples of plate heat exchangers having double wall plates formed by two adjoining plates compressed to be in contact with each other.

U.S. Pat. No. 4,903,758 discloses a plate heat exchanger, in which an electrode extends through the plate heat exchanger through an aperture in each heat exchanger plate.

SUMMARY OF THE INVENTION

The object of the present invention is to provide improved detection possibilities, especially of leakage, in plate heat exchangers comprising double wall plates.

This object is achieved by the heat exchanger plate initially defined, which is characterised in that the heat exchanger plate comprises a sensor which is configured to sense at least one parameter and to produce a signal depending on the parameter and that the sensor comprises a sensor probe that is provided between the adjoining plates.

Advantageously, at least one of the adjoining plates is deformed to house the sensor probe between the adjoining plates, wherein a cavity is provided in the proximity of the sensor probe between the sensor probe and the adjoining plates.

Such a sensor may comprise or consist of a leak detection sensor, a temperature sensor, a pressure sensor, a fouling sensor or any other possible sensor.

In an application of a sensor comprising a leak detection sensor or moisture sensor, the invention makes it possible to detect leakage in an individual heat exchanger plate. It will thus be possible to determine the position of the leakage in the plate heat exchanger, which may comprise a very large number of heat exchanger plates. The detection is essentially immediate, i.e. as soon as a leakage of one of the adjoining plates occurs a signal will be produced.

The heat exchanger plate may also comprise a number of portholes, which extend through the heat exchanger plate and are located inside the edge area. Such portholes may form porthole channels for the supply and discharge of media into and out from a plate heat exchanger comprising the heat exchanger plates according to the invention. However, the invention is also applicable to plate heat exchangers where the media are supplied and/or discharged into and out of the plate heat exchanger via the sides of the plate heat exchanger, i.e. in parallel with the extension plane of the heat exchanger plates.

According to an embodiment of the invention, the sensor comprises an insulation which insulates the sensor probe from electric contact with adjoining plates. Such an insulation prevents the sensor probe from undesired influences from the adjoining plates, which may be manufactured of a metal material, such as stainless steel, titanium, aluminium, copper, etc. The insulation may comprise or consist of a layer, or a thin layer, of a polymer.

According to an embodiment of the invention, the sensor probe is made of an electrically conducting material in the shape of wire, a strip or a foil. The electrically conducting material may comprise a metal, e.g. at least one of the elements Cu, Ag and Al.

According to an embodiment of the invention, the sensor probe is configured to sense the parameter between the electrically conducting material of the sensor probe and the adjoining plates.

According to an embodiment of the invention, the parameter comprises one of the capacitance, the impedance, the electrical resistance and the temperature.

The capacitance between the electrically conducting material of the sensor probe and the adjoining plates may thus be sensed. There is a cavity in the proximity of the sensor probe, which is formed when the adjoining plates are compressed against each other with the sensor probe positioned therebetween.

The inventors have realised that the capacitance is changed already when a small quantity of moisture is present in this cavity in the proximity of the sensor probe. When a leakage occurs anywhere on one of the adjoining plates, the medium will be distributed in the space between the adjoining plates by capillary forces. A certain quantity of moist will thus be present in the cavity independently of the position of the sensor probe in relation to the leakage. The fluid of the moist will change the dielectric properties of the cavity between the sensor probe, i.e. the insulated electric conducting material, and the adjoining plates.

From experimental tests the inventors have found a very good response when using a thin insulted metallic wire in a double wall plate against very small amounts of fluid. The minimum detectable leakage will depend on several factors, for instance capacitance between the electrodes, layout of the electrodes etc. In the case of an insulated wire, which does not cover the entire surface between the plates, the stochastic process of leaking fluid between the plates may cause the minimum detectable leakage volume to fluctuate from experiment to experiment. However, repeatability was achieved for a very small volume in a laboratory setup.

Capacitance is a measure of the amount of electric charge that electrodes can store at a given voltage between the electrodes. In the space between the electrodes, a dielectric can be placed that increases the value of the capacitance. The dielectric is ideally an absolute electric insulator that prevents charges from moving between the two electrodes, resulting in no electric current building up between the electrodes. However, the dielectric has a resistivity even if it is very high. As an approximation, the effective electric equivalence of a true/real capacitance can thus be described as a capacitance in parallel with a resistance due to the resistivity of the dielectric.

The dielectric may also have a frequency dependant dielectric constant due to the time lag between the electric field and the electric polarisation in the dielectric. The imaginary part of the frequency dependent complex dielectric constant is an electric loss term and can be considered as a resistance and incorporated in the resistance mentioned above. The resistance is then due to both electric charges that can move in the dielectric (electric current) and due to the frequency dependent dielectric constant (the loss term). Both of these behaviours contribute to the total resistance between the electrodes and result in a frequency dependent resistance. The real part of the complex dielectric constant is directly related to the capacitance value itself. There can also be a frequency dependent dielectric constant of the insulation layer (if any) of the electrodes. The loss term (imaginary part of the dielectric constant) of the insulation layer is then also contributing to the frequency dependent resistance. The resistance at zero frequency, DC resistance, is the sum of the resistance due to charge transport (resistivity) of the different materials between the electrodes (insulation layer of the electrodes, dielectric material etc).

If we take pure distilled water absolutely free of ions as the dielectric material the relative dielectric constant is about 80 at low frequencies and the imaginary part (the loss term) is practically zero. This means that the capacitance will increase when a part of the space between the electrodes is filled with water. If more water enters into the space, the capacitance will further increase. If all of the space is filled with water, the capacitance value will saturate.

At high frequencies (in the GHz region) the loss term (imaginary part) increases (which affects the resistance) and the real part decreases (which affects the capacitance itself). If ions (positive or negative) are present in the water (or other fluid as dielectric) the ions move in the liquid when there is an electric field (that is a voltage of the electrodes) present in the dielectric. When the electric field is time dependent, the ions oscillate in translation and affect the frequency dependent imaginary part of the dielectric constant (the loss term), creating a frequency dependent resistance between the electrodes. This effect increases with decreasing frequency and can be significant in the MHz region or lower frequency range. In other words, the frequency dependent resistance will be affected when water (or other fluids with movable ions) is present as a dielectric media.

Moisture or humidity measurements using capacitance detection may thus be utilized in moisture and humidity sensors. The moisture detection technique is based on measurement of the capacitance of a dielectric that can absorb the moisture. Since water has a high dielectric constant as mentioned above, the capacitance of the dielectric changes very much.

The resistance between the electrically conducting material of the sensor probe and the adjoining plates may also be sensed. The resistance will decrease if a defect on the insulation would occur, and the resistance may thus be used to detect such defects. The position of the heat exchanger plate with a defect sensor probe in a plate heat exchanger may thus be determined in a convenient manner.

According to an embodiment of the invention, the sensor probe is located in the heat transfer area. The sensor probe may extend in an arbitrary manner along a part of the heat transfer area.

According to an embodiment of the invention, the heat exchanger plate comprises a gasket area, which extends around the heat transfer area between the heat transfer area and the edge area and on which a gasket extends. Advantageously, at least one of the adjoining plates in the gasket area comprises a depression extending along the gasket area in parallel with the edge area, thereby forming a gap between the adjoining plates along the gasket area, wherein a further gasket is provided in the gap. Such a further gasket will seal the space between the adjoining plates, preventing any external liquid from penetrating the space between the adjoining plates. This is advantageous, for instance, in order to ensure a reliable sensing of a possible leakage. Furthermore, the sensor probe may be at least partly located in the gap, wherein the sensor probe is provided beside the further gasket towards the heat transfer area. Any possible leaking medium will thus reach the gap and the sensor probe. Any external fluid, such as cleaning solutions, rain water, etc., from outside will be prevented from reaching the sensor probe by the further gasket.

The sensor may comprise two sensor probes. With only one sensor probe the capacitance between the sensor probe and the adjoining plates can be measured. With two sensor probes the capacitance between the two sensor probes may be sensed. Both sensor probes may have the same configuration and be insulated by means of a respective insulation from the adjoining plates.

According to an embodiment of the invention, the sensor extends to a connection point provided in the edge area.

According to an embodiment of the invention, a connection part of the sensor, which extends to the connection point, has a foil shape at least at the gasket area. The gasket area may comprise or be formed as a gasket groove extending around the heat transfer area for receiving the gasket. The foil shape of the connection part is advantageous in order to increase the strength of the connection part so that it may withstand the bending needed to pass the gasket groove. The connection part is preferably provided with an insulation, which insulates the connection part from electric contact with the adjoining plates.

The other end of the sensor probe may be insulated, for instance by means of the insulation mentioned above.

According to an embodiment of the invention, one of the adjoining plates has a cut-out in the edge area exposing the connection part. Such a cut-out, or recess, enables connection of any suitable contacts or electronic equipment to the connection point and thus to the sensor probe for communication of the signal.

According to an embodiment of the invention, the sensor extends to a further connection point provided in the edge area. By providing two connection points it is possible to sense the resistance of the sensor probe. The resistance of the sensor probe is dependent on the mean temperature over the length of the sensor probe, when comprising an electrically conducting material, such as a metal. The sensing of the resistance of the sensor probe may thus be used to sense the temperature at a desired position in the heat exchanger plate, and consequently in a plate heat exchanger.

According to an embodiment of the invention, the heat exchanger plate comprises a communication module, which comprises an electronic circuit and communicates with the sensor. The sensor probe of the sensor, or sensors, may be connected, or directly connected, to the communication module, for instance at the connection point. Advantageously, the sensor extends to a connection point provided in the edge area, wherein the communication module may be connected to the connection part of the sensor at the connection point. The communication module may thus be attached to or mounted on the heat exchanger plate. Furthermore, the sensor extends to a further connection point provided in the edge area, wherein the sensor may comprise a further connection part, and the communication module may be connected to the further connection part at the further connection point.

The object is also achieved by the plate heat exchanger initially defined which comprises a plurality of heat exchanger plates according to any of the definitions given above, the heat exchanger plates being arranged beside each other to define several first plate interspaces for a first medium and several second plate interspaces for a second medium. Advantageously, the plate heat exchanger comprises a master unit configured to receive and process the signal from the sensor probes of all the heat exchanger plates, wherein each heat exchanger plate comprises a communication module, which comprises an electronic circuit and communicates with the sensor, and wherein each communication module is comprised by a communication bus which communicates with the master unit.

BRIEF DESCRIPTION OF THE DRAWINGS

The present invention will now be explained more closely by means of a description of various embodiments and with reference to the drawings attached hereto.

FIG. 5 illustrates a sectional view of a part of the plate heat exchanger in FIG. 1.

FIG. 5a illustrates a front view of a part of an edge area of a heat exchanger plate.

FIG. 6 illustrates a sectional view of a heat exchanger plate according to another embodiment.

FIG. 7 illustrates a sectional view of a heat exchanger plate according to a further embodiment.

DETAILED DESCRIPTION OF VARIOUS EMBODIMENTS OF THE INVENTION

Figure 1:
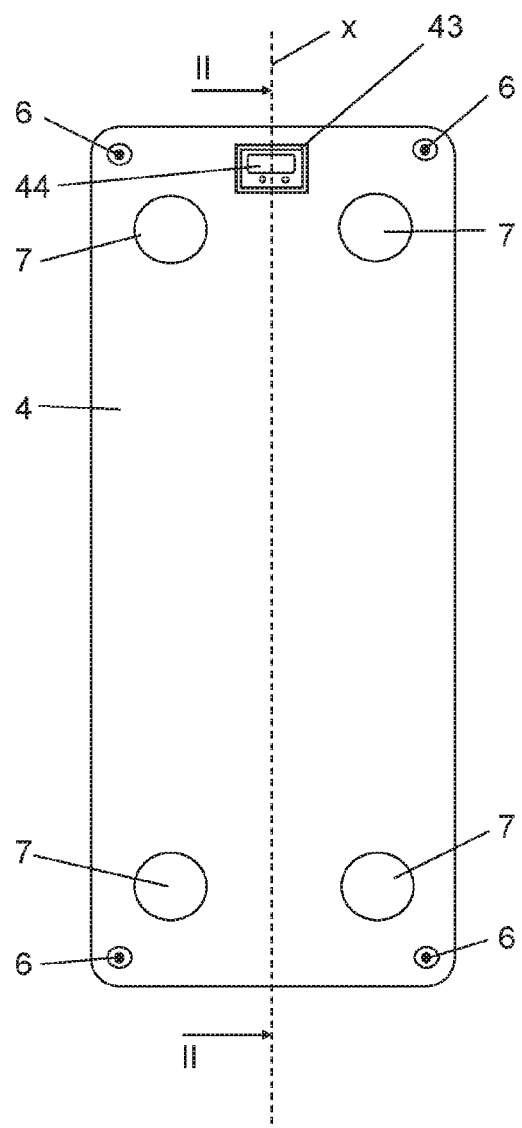
FIG. 1 illustrates a front view of a plate heat exchanger comprising a plurality of heat exchanger plates according to an embodiment of the invention.
Figure 2:
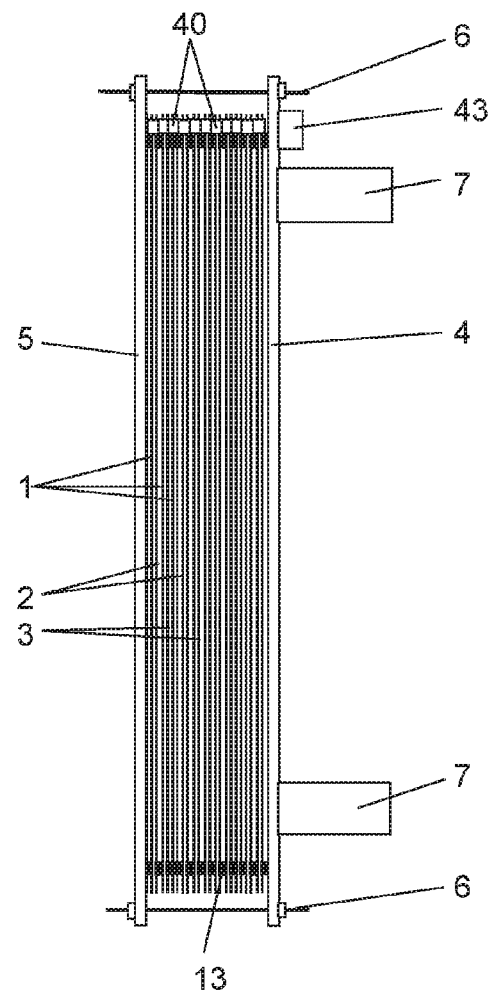
FIG. 2 illustrates a side view of the plate heat exchanger along the line II-II in FIG. 1.
Figure 1A:
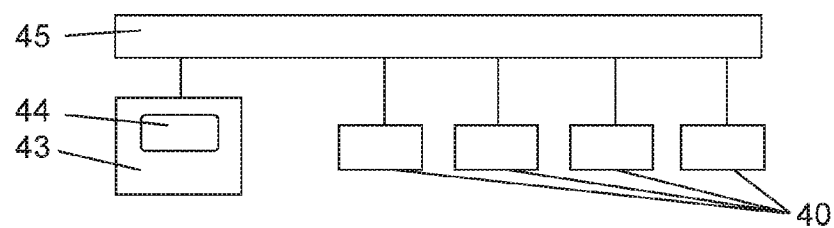
FIG. 1A illustrates a schematic view of the communication bus operatively connected to the master unit and the communication modules.

FIGS. 1 and 2 show a plate heat exchanger comprising a plurality of heat exchanger plates 1 forming a plate package. The heat exchanger plates 1 are arranged beside each other to define several first plate interspaces 2 for a first medium and several second plate interspaces 3 for a second medium. The first plate interspaces 2 and the second plate interspaces 3 are arranged in an alternating order in the plate package. The heat exchanger plates 1 of the plate package are pressed against each other between a frame plate 4 and a pressure plate 5 by means of tie bolts 6. In the embodiments disclosed, the plate heat exchanger comprises four porthole channels 7 forming an inlet and an outlet for the first medium and an inlet and an outlet for the second medium.

Figure 3:
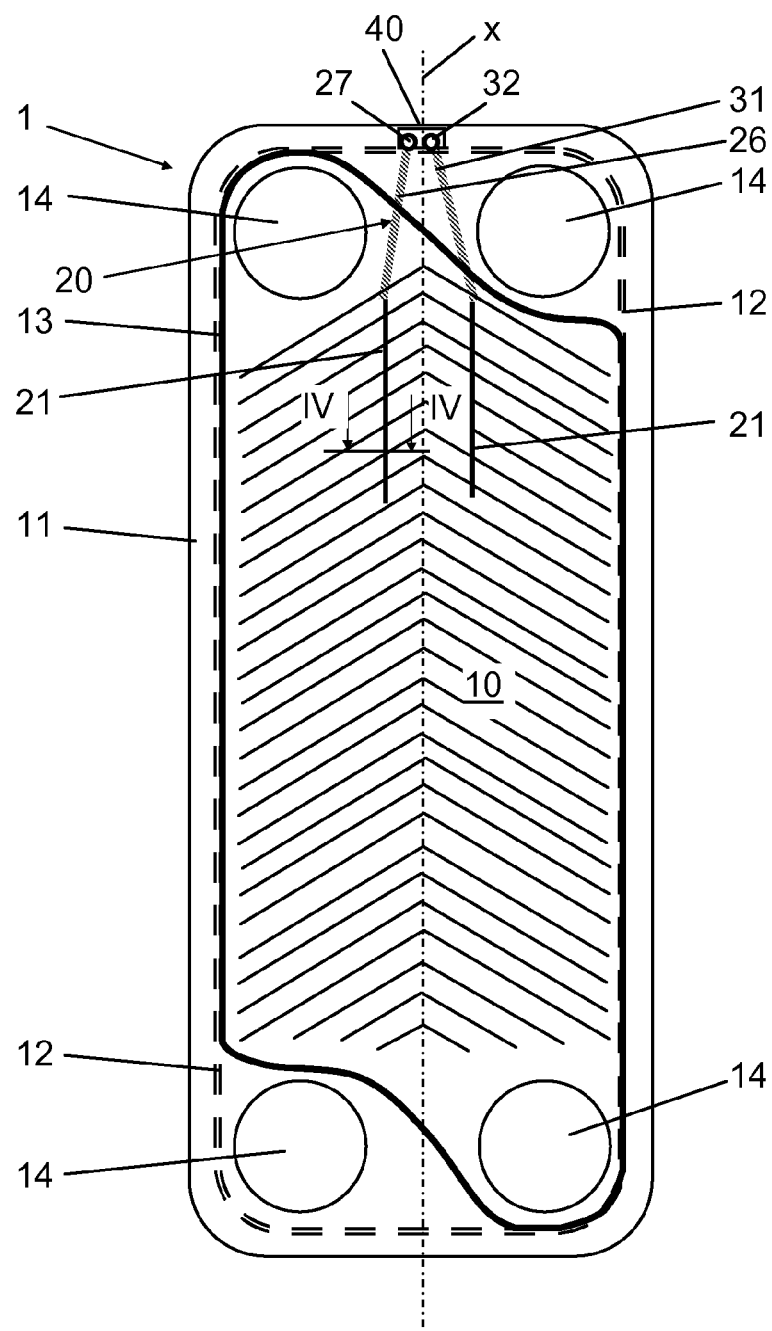
FIG. 3 illustrates a front view of a heat exchanger plate of the plate heat exchanger in FIG. 1.

One of the heat exchanger plates 1 is disclosed in FIG. 3. The heat exchanger plate 1 comprises a heat transfer area 10, an edge area 11, which extends around and outside the heat transfer area 10, and a gasket area 12, which extends around the heat transfer area 10 between the heat transfer area 10 and the edge area 11. A gasket 13 is provided on the gasket area 12 and extends around and encloses the heat transfer area 10. In the embodiments disclosed, four portholes 14 are provided and extend through the heat exchanger plate 1. The portholes 14 are located inside and in the proximity of the edge area 11. The portholes 14 are aligned with the porthole channels 7.

In the embodiments disclosed the plate heat exchanger is thus mounted and held together by means of tie bolts 6 and gaskets 13.

It is to be noted, however, that the invention is applicable also to plate heat exchangers of other kinds. The heat exchanger plates 1 may for instance be permanently connected to each other by means of welding, such as laser welding or electron beam welding, gluing or even brazing. An example of an alternative mounting of the heat exchanger plates 1, is a so called semi-welded plate heat exchanger where the heat exchanger plates 1 are welded to each other in pairs, whereby the pairs of heat exchanger plates 1 may be pressed against each other by means of tie bolts with gasket provided between the pairs. Furthermore, it is to be noted that the plate heat exchanger may lack porthole channels, whereby the sides of the plate heat exchanger present openings to the plate interspaces 2 and 3 for the supply and discharge of the media. Alternatively, one of the plate interspaces 2, 3 may be accessible via porthole channels, whereas the other of the plate interspaces may be accessible via the side of the plate heat exchanger.

Figure 4:
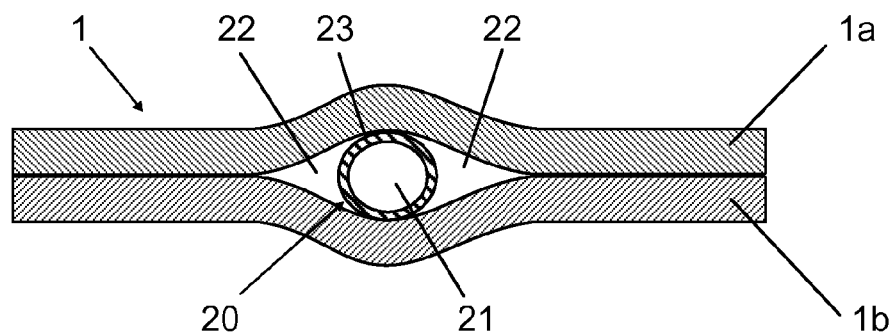
FIG. 4 illustrates a sectional view along the line IV-IV in FIG. 3.

The heat exchanger plate 1 is a double wall plate, see FIG. 4, i.e. the heat exchanger plate 1 is formed by two adjoining plates 1a, 1b compressed to be in contact with each other. The adjoining plates 1a, 1b are manufactured of an electrically conducting material, for instance a polymer material or a metal material, such as stainless steel, titanium, aluminium, copper, etc.

The heat exchanger plate 1 comprises a sensor 20, which is configured to sense at least one parameter and to produce a signal depending on the parameter. The sensor 20 comprises a sensor probe 21 that is provided between the adjoining plates 1a, 1b and located in the heat transfer area 10. It is to be noted here that only the parts of the plates located in the proximity of the sensor probe 21 need to be made of an electrically conducting material.

The sensor probe 21 is preferably positioned between the adjoining plates 1a and 1b before they are finally mounted or compressed together. A deformation of the material of the adjoining plates 1a, 1b may take place in connection with the compressing so that there will be a protruding area along the sensor probe 21 on at least one of the adjoining plates 1a and 1b, as can be seen in FIG. 4. Thereby a cavity 22 is formed in the proximity of the sensor probe 21. The cavity 22 may also be formed in advance, i.e. before the sensor 20 and the sensor probe 21 are positioned between the plates 1a and 1b. The adjoining plates 1a, 1b may then be compressed together in a first step. Thereafter the plates 1a, 1b are separated, and one or both of the plates 1a, 1b are deformed to form the cavity 22 in a suitable pressing tool. The sensor 20 and the sensor probe 21 are then positioned in the cavity 22, whereafter the plates 1a, 1b are pressed against each other.

The cavity 22 extends along the sensor probe 21 between the sensor probe 21 and the adjoining plates 1a, 1b. The compressing of the adjoining plates 1a, 1b takes place at a high pressure so that the space remaining between the adjoining plates 1a, 1b is very thin, merely permitting transport or distribution of a fluid by means of capillary forces. However, such distribution will ensure that any of the primary and secondary medium entering the space between the adjoining plates 1a, 1b will reach the cavity 22.

In order to achieve a sufficient space between the adjoining plates 1a, 1b for the capillary forces to permit the distribution of the liquid, one or both of the plates 1a, 1b on the surface turned towards the other plate, may have a pattern or other irregular surface structure, for instance a rest pattern from the manufacturing of the sheet material of the plates 1a, 1b. It is to be understood that such a surface structure is very thin in the order of a few microns.

As can be seen in FIG. 4 the sensor 20 comprises an insulation 23 which surrounds and insulates the sensor probe 21 from electric contact with the adjoining plates 1a, 1b. The sensor probe 21 is made of an electrically conducting material, preferably a metal or metal alloy. In certain applications, also a sensor probe 21 of a semi-conducting material could be possible. The electrically conducting material may for instance comprise or consist of at least one of the elements Cu, Ag and Al. The insulation is formed by a layer, or thin layer, of a polymer. In the embodiments disclosed, the sensor probe is formed as an elongated wire. However, it is to be noted that the sensor probe 21 also may have other shapes, such as a strip, a foil or a net.

The sensor probe 21 is in the embodiments disclosed configured to sense the parameter between the electric conducting material of the sensor probe 21 and the adjoining plates 1a, 1b. The parameter is in the embodiments disclosed in the first place the capacitance between the electrically conducting material of the sensor probe 21 and the adjoining plates 1a, 1b. The parameter may also be the impedance between the sensor probe 21 and the adjoining plates 1a, 1b. It can be noted that the sensor 20 may comprise two sensor probes 21 of similar configuration and positioned at a certain distance from each other. In such an arrangement, the parameter, for instance the capacitance, between the two sensor probes 21 may instead be sensed.

In case of a crack leading to a leakage in any one of the adjoining plates 1a, 1b, one of the primary and secondary media will enter the space between the adjoining plates 1a and 1b and be distributed to the cavity, or cavities 22 by means of capillary forces. The medium will change the properties of the dielectric between the sensor probe 21 and the adjoining plates 1a, 1b, or between the two sensor probes 21, as explained above. The proper function of the sensor probe 21 may also be sensed by sensing the resistance between the sensor probe 21 and the adjoining plates 1a, 1b. In case the insulation 23 is broken, the resistance will decrease significantly as an indication thereof.

The sensor 20, in the embodiments disclosed, comprises at least a connection part 26 connected to an end of the sensor probe 21. The connection part 26 extends to a connection point 27 provided in the edge area 11. The connection part 26 may have a foil shape, at least at the gasket area 12. In an embodiment disclosed in FIG. 5, the adjoining plates 1a, 1b comprise, in the gasket area 12, a depression extending along the gasket area 12 in parallel with the edge area 11. The depression forms a gasket groove for receiving the gasket 13. The connection part 26 is bent to follow the depressions when passing the gasket area 12. Thanks to the foil shape of the connection part 26, the strength thereof is increased to withstand such bending. The connection part 26 is made of an electrically conducting material, and provided with an insulation of the same kind as sensor probe 21. It is to be noted, that the connection part 26 may form a part of the sensor probe 21. The connection part 26 may also be provided for the sole purpose of transmitting signals between the sensor probe 21 and the connection point 27.

It is possible to make the depression of one 1b of the adjoining plates 1a, 1b deeper than the depression of the other 1a of the adjoining plates 1a, 1b. In such a way, a gap 28 is formed between the adjoining plates 1a, 1b, see FIGS. 6 and 7, along the gasket area 12. A further gasket 29 is in the embodiments disclosed in FIGS. 6 and 7 provided in the gap 28. Such a further gasket 29 seals the space between the adjoining plates 1a, 1b and ensures that no external liquid may penetrate the space between the adjoining plates 1a and 1b. Such a further gap 28 may also be provided in case the gasket area 12 of one 1a of the adjoining plates 1a, 1b is flat, and the gasket area 12 of the other 1b adjoining plates 1a, 1b is slightly depressed.

The connecting part 26 may pass the further gasket 29, either through the further gasket 29, see FIG. 6, or beside the further gasket 29.

As an alternative, the sensor probe 21 may, instead of being provided in the heat transfer area 10, be provided or located at least partly in the gap 28, as illustrated in FIG. 7. The sensor probe 21 extends along the further gasket 29 and is provided beside the further gasket 29 towards the heat transfer area 10. If any one of the adjoining plates 1a, 1b is broken, the possibly leaking medium will reach the gap 28 and the sensor probe 21 provided therein. Fluid from outside will be prevented from reaching the sensor probe 21 in the gap 28 thanks to the further gasket 29.

Figure 8:
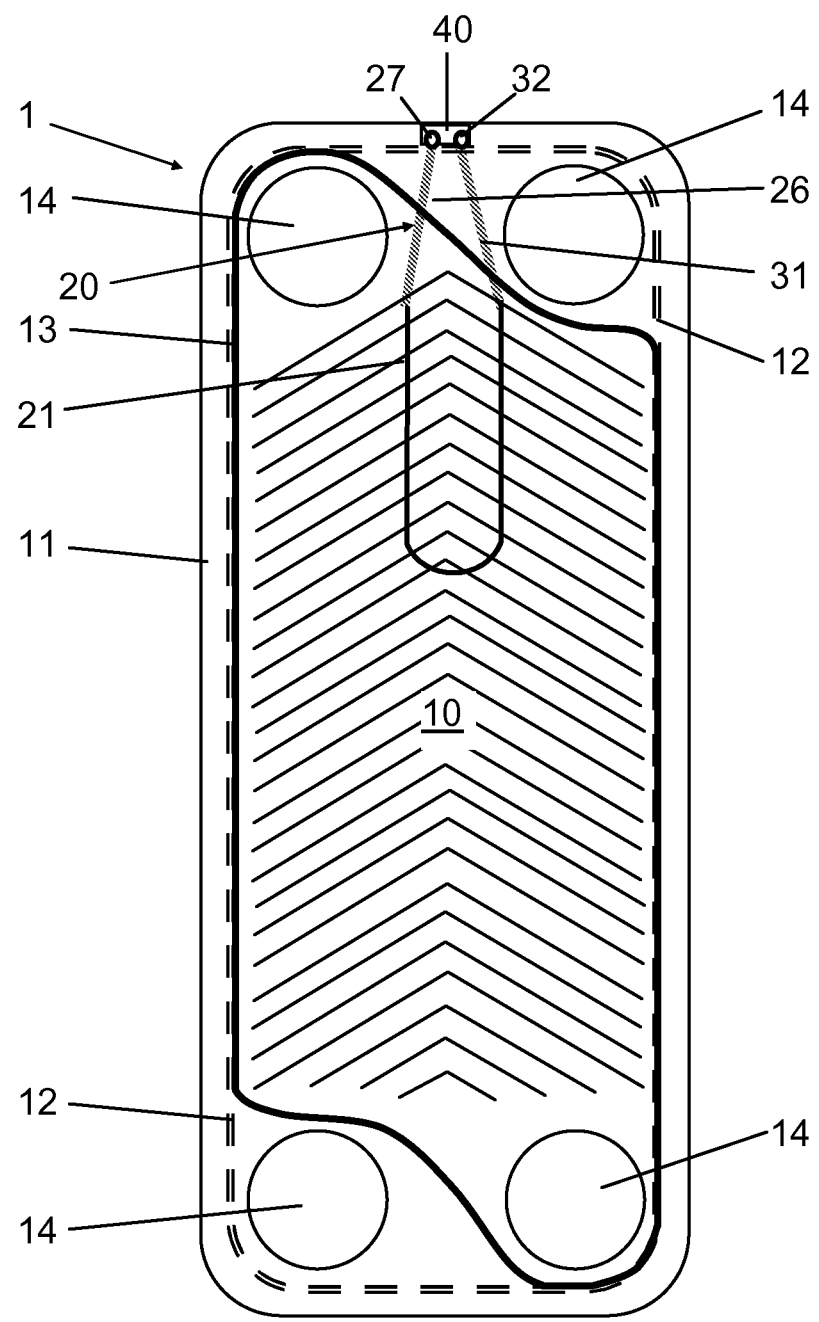
FIG. 8 illustrates a front view of a heat exchanger plate according to another embodiment.

The sensor 20 may also comprise a further connection part 31 connected to the other end of the sensor probe 21. The further connection part 31 extends, as illustrated in FIG. 8, to a further connection point 32 provided in the edge area 11. Such an embodiment enables sensing of the resistance of the sensor probe 21. Since the resistance is temperature dependent, the value of the resistance may be used for determining the mean temperature along the sensor probe 21 for each individual heat exchanger plate 1. In this case the sensor probe 21 may also be or comprise a thermocouple element for sensing the temperature in the proximity of one of the sensing points of the thermocouple element.

As can be seen in FIGS. 5-7, one 1a of the adjoining plates 1a, 1b has a cut-out 34 in the edge area 11 exposing the connection part 26, and the possible further connection part 31. By such a cut-out 34, the connection parts 26, 31, or the respective connection point 27, 32, are accessible from outside for connection to a suitable electronic circuit, or external electronics. In FIGS. 5-7 the cut-out 34 is provided in the edge area 11 without reaching the edge of the plate 1a. However, the cut-out 34 may extend from the edge.

According to a further embodiment, each heat exchanger plate comprises a communication module 40, such as a so called bus module, which comprises an electronic circuit and communicates with the sensor 20 or sensors 20. The communication module 40 may for instance be attached to the heat exchanger plate 1 in the edge area 11. The communication module 40 may be connected to the connection part 26 at the connection point 27, and possibly to the further connection part 31 at the further connection point 32.

The communication module 40 has at least one primary contact element 41 located on a primary side of the heat exchanger plate 1, and at least one secondary contact element 42 located on an opposite secondary side of the heat exchanger plate 1. When the heat exchanger plates 1 are compressed to each other the primary contact element 41 will be in electrical contact with the secondary contact element 42, as illustrated in FIG. 5. If the communication module 40 comprises only one primary contact element 41 and only one secondary contact element 42, a further electrical connection may be provided via the heat exchanger plates 1. The communication module 40 may also comprise two, three or more primary contact elements 41 and secondary contact elements 42.

Each communication module 40 is comprised by a communication bus 45 which communicates with a master unit 43 comprising a processor of any suitable kind, see FIGS. 1 and 2. Signals from each sensor probe 21 may thus be communicated to the master unit 43 via the respective communication module 40. The master unit 43 is thus configured to receive and process the signals from the sensor probes 21 of all the heat exchanger plates 1. The master unit 43 may comprise a display 44 for displaying information to a user. The master unit 43 may also comprise means for communication with other systems, such as an overall control or monitoring system.

Furthermore, it is to be noted that the communication elements 26, 31 may be dispensed with. The sensor probe 21 may be thus be extended to be directly connected to the communication module 40, possibly via a connection point 27, 32.

The present invention is not limited to the embodiments disclosed but may be varied and modified within the scope of the following claims.

The invention claimed is:

1. A double wall heat exchanger plate, comprising
a heat transfer area, and
an edge area, which extends around and outside the heat transfer area,
wherein the double wall heat exchanger plate is formed by two adjoining plates compressed to be in contact with each other,
wherein the double wall heat exchanger plate comprises a sensor which is located in the heat transfer area and is configured to sense at least one parameter and to produce a signal depending on the parameter and that the sensor comprises a sensor probe that is provided between the adjoining plates of the double wall heat exchanger plate, said parameter comprising the capacitance,
wherein the double wall heat exchanger plate is configured to be included in a plate heat exchanger having a plurality of the double wall heat exchanger plates being arranged beside each other to define a plurality of first plate interspaces for a first medium and a plurality of second plate interspaces for a second medium,
wherein the sensor comprises an insulation which insulates the sensor probe from electric contact with the adjoining plates, and
wherein the sensor is configured to be disposed in one of the first or second interspaces.

2. The double wall heat exchanger plate according to claim 1, wherein the sensor probe is made of an electrically conducting material in the shape of at least a wire, a strip or a foil.

3. The double wall heat exchanger plate according to claim 2, wherein the sensor probe is configured to sense the parameter between the electrically conducting material of the sensor probe and the adjoining plates.

4. The double wall heat exchanger plate according to claim 1, comprising a gasket area, which extends around the heat transfer area between the heat transfer area and the edge area and on which a gasket extends.

5. The double wall heat exchanger plate according to claim 4, wherein at least one of the adjoining plates in the gasket area comprises a depression extending along the gasket area in parallel with the edge area, thereby forming a gap between the adjoining plates along the gasket area, and wherein a further gasket is provided in the gap.

6. The double wall heat exchanger plate according to claim 5, wherein the sensor probe is at least partly located in the gap, and wherein the sensor probe is provided beside the further gasket towards the heat transfer area.

7. The double wall heat exchanger plate according to claim 1, wherein the sensor extends to a connection point provided in the edge area.

8. The double wall heat exchanger plate according to claim 7, comprising a gasket area, which extends around the heat transfer area between the heat transfer area and the edge area and on which a gasket extends, wherein a connection part of the sensor, which extends to the connection point, has a foil shape at least at the gasket area.

9. The double wall heat exchanger plate according to claim 8, wherein one of the adjoining plates has a cut-out in the edge area exposing the connection part.

10. The double wall heat exchanger plate according to claim 7, wherein the sensor extends to a further connection point provided in the edge area.

11. The double wall heat exchanger plate according to claim 1, comprising a communication module, which comprises an electronic circuit and communicates with the sensor.

12. The double wall heat exchanger plate according to claim 11, wherein the sensor extends to a connection point provided in the edge area and wherein the communication module is connected to the sensor at the connection point.

13. The double wall heat exchanger plate according to claim 12, wherein the sensor extends to a further connection point provided in the edge area, wherein the sensor comprises a further connection part and wherein the communication module is connected to the further connection part at the further connection point.

14. A plate heat exchanger comprising a plurality of double wall heat exchanger plates according to claim 1, the double wall heat exchanger plates being arranged beside each other to define a plurality of first plate interspaces for a first medium and a plurality of second plate interspaces for a second medium.

15. A plate heat exchanger according to claim 14, comprising a master unit configured to receive and process the signal from a plurality of sensor probes of all the double wall heat exchanger plates, wherein each double wall heat exchanger plate comprises a communication module, which comprises an electronic circuit and communicates with the sensor, and wherein each communication module is comprised by a communication bus which communicates with the master unit.

* * * * *